(12) United States Patent
DuBois (10) Patent No.: US 7,828,352 B2
(45) Date of Patent: Nov. 9, 2010

(54) BOX LIFTING DEVICES

(75) Inventor: Dennis DuBois, Las Vegas, NV (US)

(73) Assignee: Primary Ventures, LLC, San Diego, CA (US)

(*) Notice: Subject to any disclaimer, the term of this patent is extended or adjusted under 35 U.S.C. 154(b) by 391 days.

(21) Appl. No.: 12/027,327

(22) Filed: Feb. 7, 2008

(65) Prior Publication Data

US 2008/0164705 A1 Jul. 10, 2008

Related U.S. Application Data

(63) Continuation-in-part of application No. 11/463,411, filed on Aug. 9, 2006, now Pat. No. 7,726,712, which is a continuation-in-part of application No. 11/201,561, filed on Aug. 10, 2005, now Pat. No. 7,237,813.

(51) Int. Cl.
*B65G 7/12* (2006.01)
(52) U.S. Cl. .................. 294/15; 294/27.1; 294/25; 16/422; 16/430
(58) Field of Classification Search .............. 294/25, 294/8.6, 15, 61, 27.1; 16/422, 425, 430; 229/117.19
See application file for complete search history.

(56) References Cited

U.S. PATENT DOCUMENTS

| | | | | |
|---|---|---|---|---|
| 1,061,014 A | * | 5/1913 | Sawyer | 294/25 |
| 1,203,339 A | | 10/1916 | Holstein | |
| 1,267,233 A | * | 5/1918 | Lafferty | 30/123 |
| 1,333,792 A | * | 3/1920 | Bunnell | 294/25 |
| 1,428,285 A | * | 9/1922 | Herbert | 224/267 |
| 2,546,113 A | * | 3/1951 | Spang | 294/1.1 |
| 2,992,466 A | | 7/1961 | Gallagher | |
| 3,574,380 A | * | 4/1971 | Tague | 294/16 |
| 4,226,349 A | | 10/1980 | Uccellini | |
| 4,280,645 A | * | 7/1981 | Goodden | 224/259 |
| 4,525,115 A | | 6/1985 | Garner | |
| 4,707,011 A | | 11/1987 | McKim | |
| 4,830,322 A | | 5/1989 | Gary | |
| 5,455,981 A | * | 10/1995 | Wiese | 15/236.01 |
| 5,599,052 A | | 2/1997 | Van Davelaar | |
| 5,687,556 A | * | 11/1997 | Lintz | 56/400.01 |
| 5,871,242 A | | 2/1999 | Whitney | |
| 5,895,018 A | | 4/1999 | Rielo | |
| 5,979,675 A | | 11/1999 | Moriarty | |
| 6,041,717 A | | 3/2000 | Kubat | |
| 6,082,794 A | | 7/2000 | Whitney | |
| 6,217,091 B1 | | 4/2001 | Whitney | |

(Continued)

*Primary Examiner*—Dean J Kramer
(74) *Attorney, Agent, or Firm*—Fish & Associates, PC (57) ABSTRACT

A box lifting device places weight upon the lateral surface of lifter's forearm or hand. Preferred embodiments include a lifting body and a handle molded as a single piece of injection molded plastic, a lifting plate having metal teeth or other lifting members, and a weight transfer member that shifts the weight of a box to a lateral surface of the users forearm or hand. The lifting members are preferably angled other than 90° relative to a long axis of the handle. Preferred lifting plates include a plurality of openings, such that the lifting members of one plate enter the openings in the other plate and vice versa during storage of the devices. Magnets can be included to couple the left and right mating pairs. Lateral and medial forearm stops can be used to restrict a bending movement of the user's wrists relative to the handle.

24 Claims, 8 Drawing Sheets

U.S. PATENT DOCUMENTS

| | | |
|---|---|---|
| 6,375,237 B1 | 4/2002 | Koenig |
| 6,422,620 B1 | 7/2002 | Jordening |
| 7,093,324 B2 | 8/2006 | Udy |
| 2007/0132254 A1* | 6/2007 | Choi .......................... 294/15 |

* cited by examiner

BOX LIFTING DEVICES

CROSS-REFERENCE TO RELATED APPLICATIONS

This application is a continuation-in-part of application Ser. No. 11/463,411, filed Aug. 9, 2006, which is a continuation-in-part of application Ser. No. 11/201,561 filed Aug. 10, 2005, which issued as U.S. Pat. No. 7,237,813. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The embodiments of the present invention relate to a device for lifting boxes.

BACKGROUND

Lifting boxes can be a tedious and unpleasant endeavor. Among other things, large boxes can be cumbersome and difficult to grip. Moreover, lifting boxes in an improper manner can cause severe back injuries. There have been many attempts to develop means and devices for improving the ease with which one can lift boxes, but none of them have been especially satisfactory.

There are many devices that operate as handles, with differences directed to the mechanism by which the devices attach to the boxes being lifted. U.S. Pat. No. 7,093,324 to Udy teaches a handle having adjustable loops that can tighten around a box. U.S. Pat. No. 4,707,011 to McKim, U.S. Pat. No. 6,375,237 to Koenig, and U.S. Pat. No. 5,871,242 to Whitney all teach devices that combine teeth with hinges, and U.S. Pat. No. 6,422,620 to Jordening, U.S. Pat. No. 6,217,091 to Whitney, U.S. Pat. No. 4,226,349 to Uccellini, and U.S. Pat. No. 1,203,339 to Holstein, all teach devices that grab a box without hinges.

Unfortunately, in all of the above devices the entirety of the weight is carried through the hands of the lifter. Thus, there is still a need for a box lifting devices that transfer at least some of the weight around the hands and wrists of the lifter.

SUMMARY OF THE INVENTION

The present invention provides apparatus, systems and methods in which at least some of the weight of a box being lifted is placed upon the lateral surface of lifter's forearm or hand.

Preferred embodiments include a lifting body and a handle molded as a single piece of injection molded plastic, a lifting plate having metal teeth or other lifting members, and a weight transfer member that shifts the weight of a box to a lateral surface of the users forearm or hand.

The lifting body can advantageously extend beyond the edges of the lifting plate to increase the surface area between the box and the device, thus stabilizing the box during lifting.

In especially preferred embodiments, the lifting members are angled other than 90° relative to a long axis of the handle, thus allowing the handles and consequently the user's wrists to be properly positioned for lifting boxes above the users head.

Preferred lifting plates include a plurality of openings in each one of the pair of devices, such that the lifting members of one plate enter the openings in the other plate and vice versa during storage of the devices. Preferred openings can also be stamped into the lifting plate by a machine press. It is further contemplated that during non-use one or more magnets can be coupled to the lifting plate, which separably couple the pair of devices, thus allowing the pair of devices to be conveniently stored.

Weight transfer members preferably include a main portion, a thumb guard, and a lateral forearm stop that restricts a bending movement of the user's wrist relative to the handle. The main portion preferably has a contact area of at least 25 $cm^2$ to spread the load, and can optionally have a cushion. The thumb guard and the lateral forearm stop are preferably continuous with, and angled relative to the main portion.

An medial forearm stop can be positioned to contact a medial surface of the user's forearm, thus further restricting a bending movement of the user's wrists relative to the handle. It is further contemplated that an optional wrist riser can be positioned to contact an anterior surface of the forearm/wrist of the user, thus maintaining the user's hand, wrist and arm in a proper alignment during use of the device. An optional palmar sweat texture portion can provide the user with an improved grip during use.

Various objects, features, aspects and advantages of the inventive subject matter will become more apparent from the following detailed description of preferred embodiments, along with the accompanying drawings in which like numerals represent like components.

DETAILED DESCRIPTION

The present invention is directed to lifting corrugated or other paper-based or soft boxes. Corrugated boxes are named for the fluted inner layer called corrugated medium that is sandwiched between layers of linerboard. Corrugated boxes are used extensively in the United States because they are inexpensive to manufacture, and are impact, drop, and vibration resistant.

Reference is now made to the figures wherein, for clarity purposes, the letter "A" corresponds to the right handed element of a mating pair, and the letter "B" corresponds to the left handed element of the pair. It should be further recognized that the right and left mating devices are preferably mirror images of each other, with some minor differences described in greater detail below.

Figure 1:
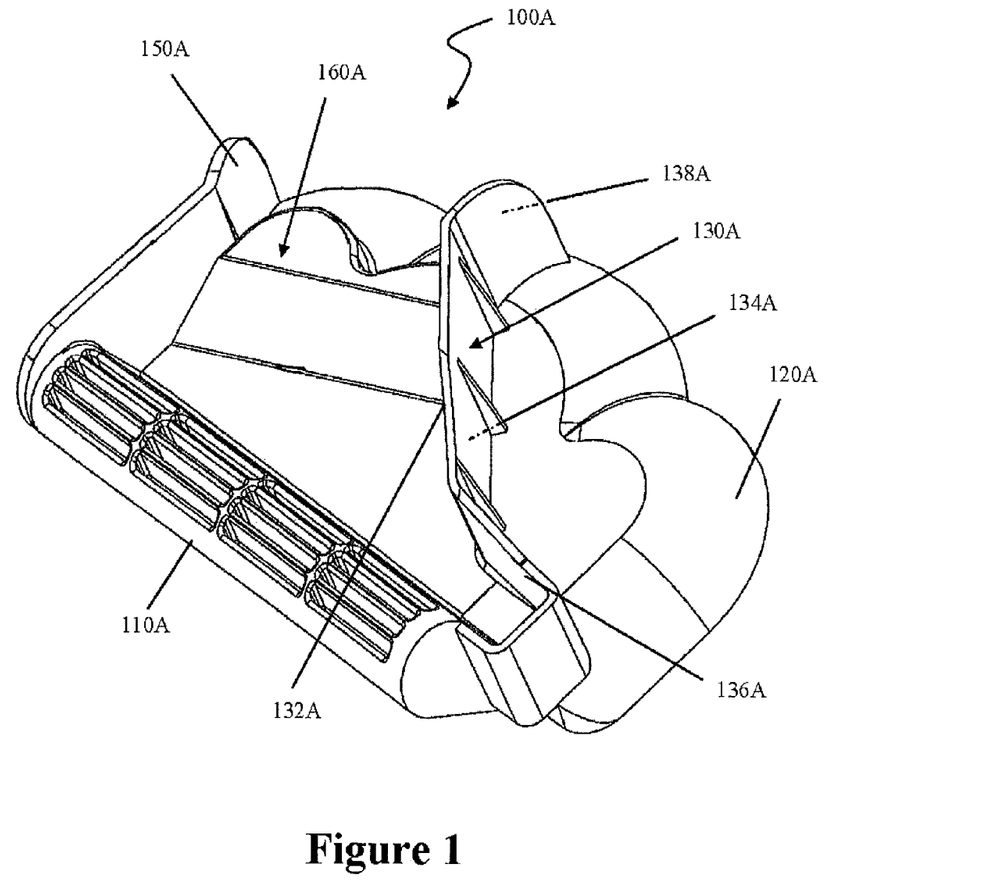
FIG. 1 is a perspective view of a right handed box lifting device.
Figure 2:
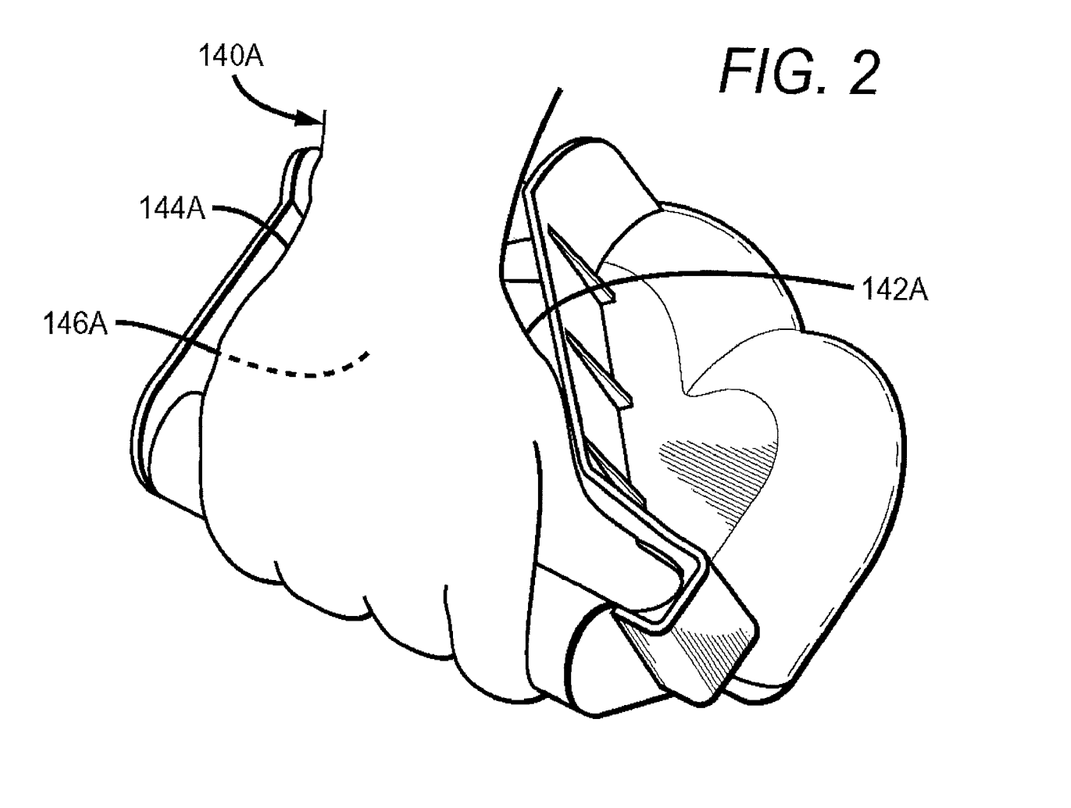
FIG. 2 is a perspective view of the device of FIG. 1 with a user's right hand in the proper position for lifting.

FIGS. 1 and 2 generally depict a right half 100A of a mating pair (left half 100B, not shown), having: a handle 110A coupled to a lifting body 120A; a lifting plate 170A (shown in FIG. 3A) coupled to the lifting body 120A with lifting members 172A (shown in FIG. 3A) extending therefrom; and a weight transfer member 130A coupled to the lifting body 120A in a manner that transfers weight from the box through a contact surface 132A of the weight transfer member 130A, to a lateral surface 142A of a right forearm/hand 140A of the user.

Figure 3A:
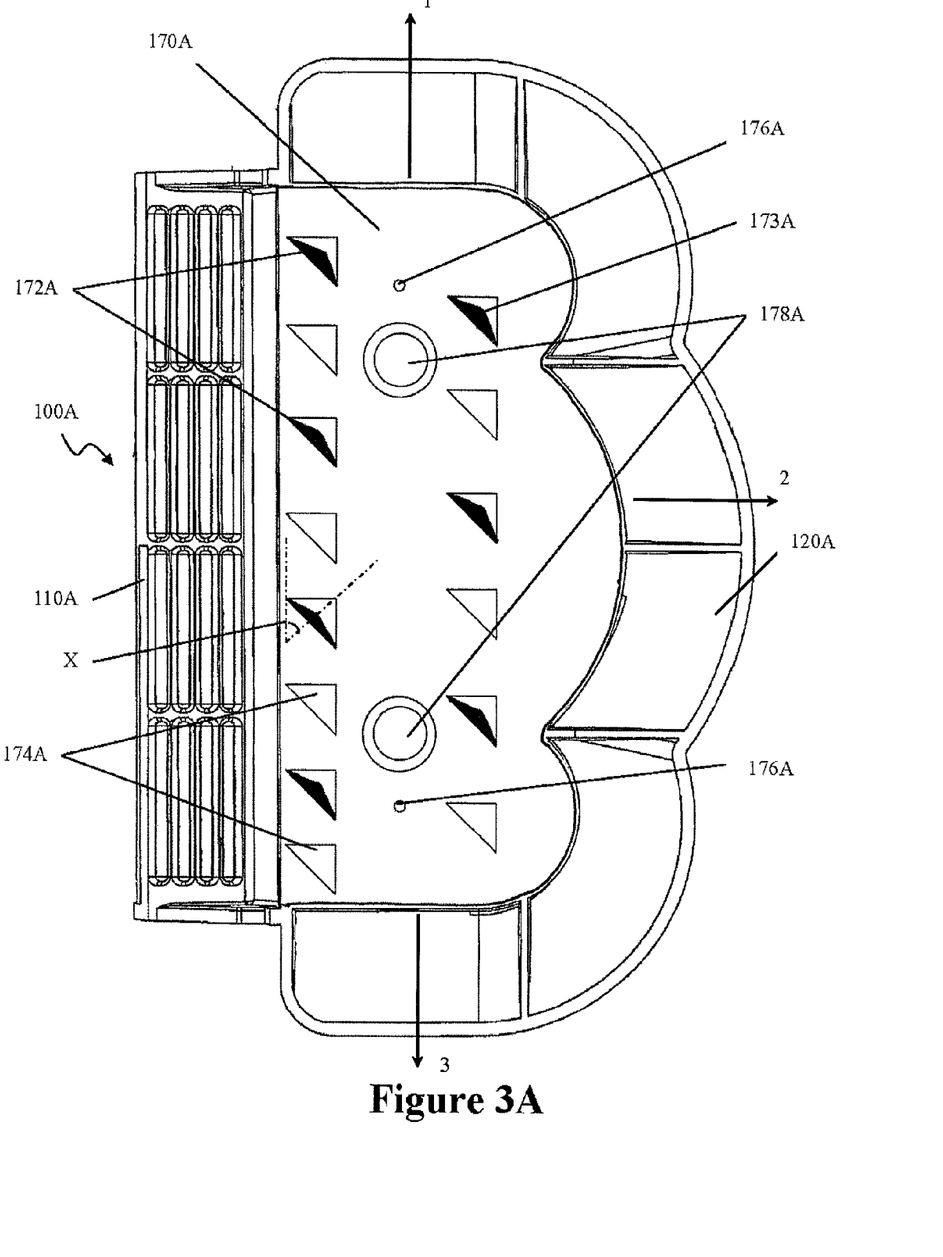
FIG. 3A is a plan view of the underside of the device of FIG. 1.
Figure 3B:
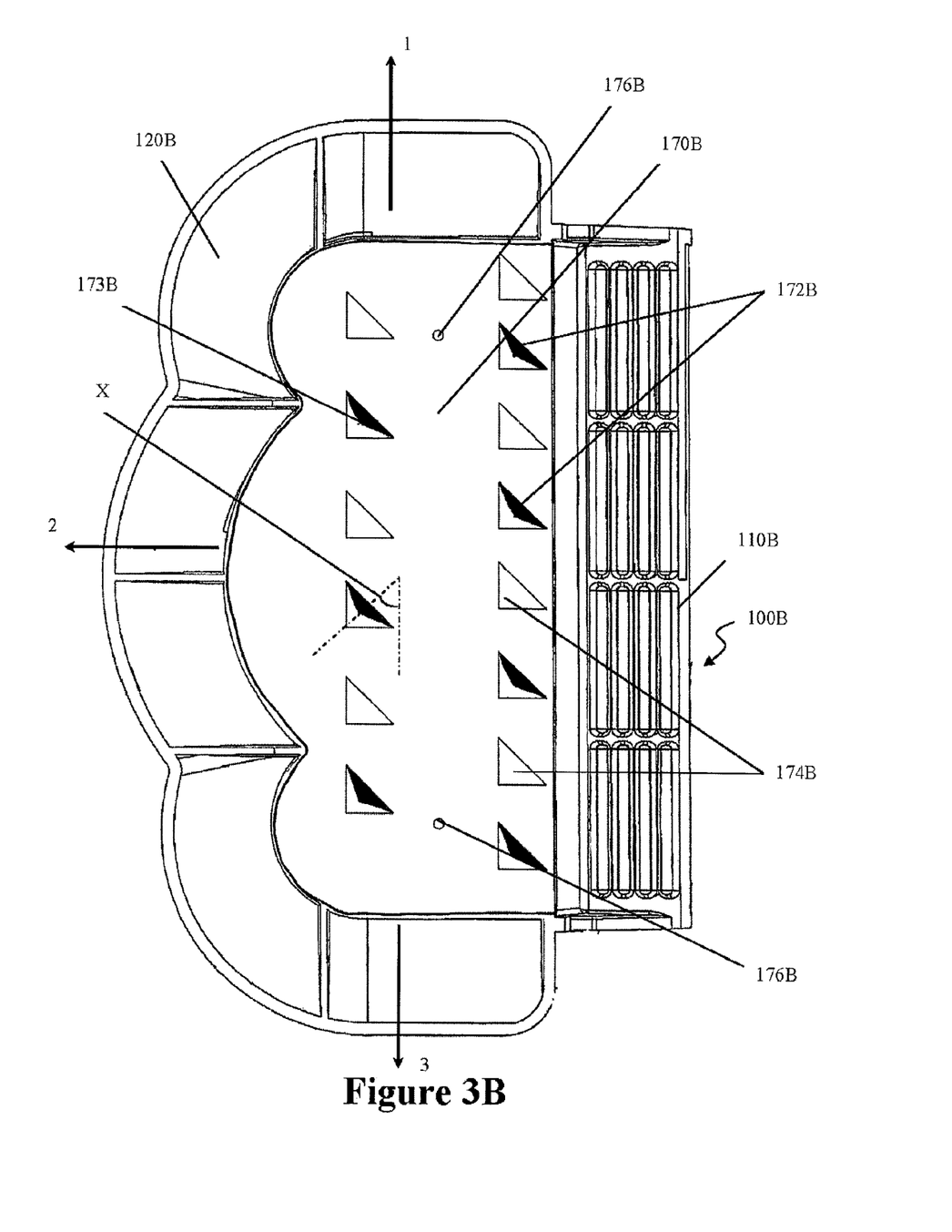
FIG. 3B is a plan view of an underside of a left half that mates with the device of FIG. 1.
Figure 6:
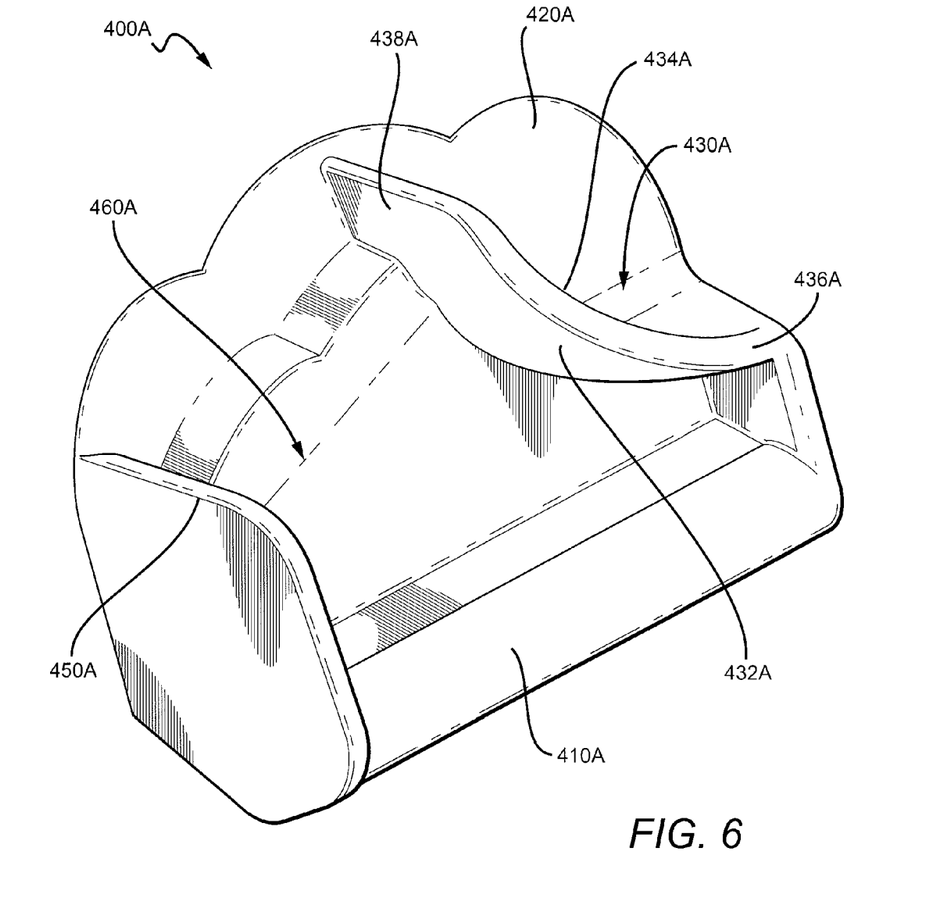
FIG. 6 is a perspective view of a further embodiment of a right handed box lifting device.

Right half 100A (and also left half 100B, not shown), with the exception of the lifting plates 170A, 170B and lifting members 172A, 172B depicted in FIGS. 3A and 3B, respectively, are fabricated by injection molding techniques. Those skilled in the art will recognize that other fabrication techniques and materials can be used. For example, the right half 100A can be fabricated as separate sections attached to one another using adhesives, screws, rivets or other suitable attachment means, but can also be fabricated as a continuous piece (as shown in FIG. 6). Once fabricated, lifting plate 170A is then joined to lifting body 120A of the right half 100A, as described in greater detail below.

Handle 110A can have any suitable size, shape, and cross-sectional area. Handle 110A can be advantageously coated with a pliable material, such as open or closed cell polymer foams (e.g., sponge like materials), thus providing the user with a non-slip grip during use.

Weight transfer member 130A includes a contact surface 132A which comprises, a main portion 134A, a thumb guard 136A, and a lateral forearm stop 138A. The weight transfer member 130A advantageously shifts the weight of a box through the contact surface 132A to the lateral surface 142A of the user's right forearm/hand 140A (shown in FIG. 2). In preferred embodiments, thumb guard 136A and lateral forearm stop 138A are continuous with, and angled relative to the main portion 134A; such that the lateral forearm stop 138A restricts a bending movement of the user's wrist relative to handle 110A. In preferred embodiments, the contact surface 132A measures at least 25, 30, 35, 40, 45, 50 cm$^2$.

In practice, as shown in FIG. 2, the user grasps the handle 110A of the right half 100A such that: (1) a lateral surface 142A of the user's right forearm/hand 140A is adjacent to the contact surface 132A, thus allowing weight transfer to occur; and (2) a medial surface 144A of the user's right forearm/hand 140A is adjacent to a medial forearm stop 150A, thus further restricting a bending movement of the user's wrist relative to handle 110A. Consequently, the weight transfer member 130A (including the lateral forearm stop 138A) and the medial forearm stop 150A act as a guide by defining an area for proper placement of the user's hand. Such a design ensures that the user grasps the device 100A properly thereby maximizing its effectiveness and reducing injuries based on improper hand placement.

In some embodiments, a wrist riser 160A is coupled to the lifting body 120A, and further maintains the user's hand, wrist and arm in a proper alignment during use of the device 100A. As shown, the wrist riser 160A extends between the weight transfer member 130A and the medial forearm stop 150A, and includes a ramp portion (not labeled) and a plateau portion (not labeled). Those skilled in the art will recognize that other configurations are possible.

Figure 5:
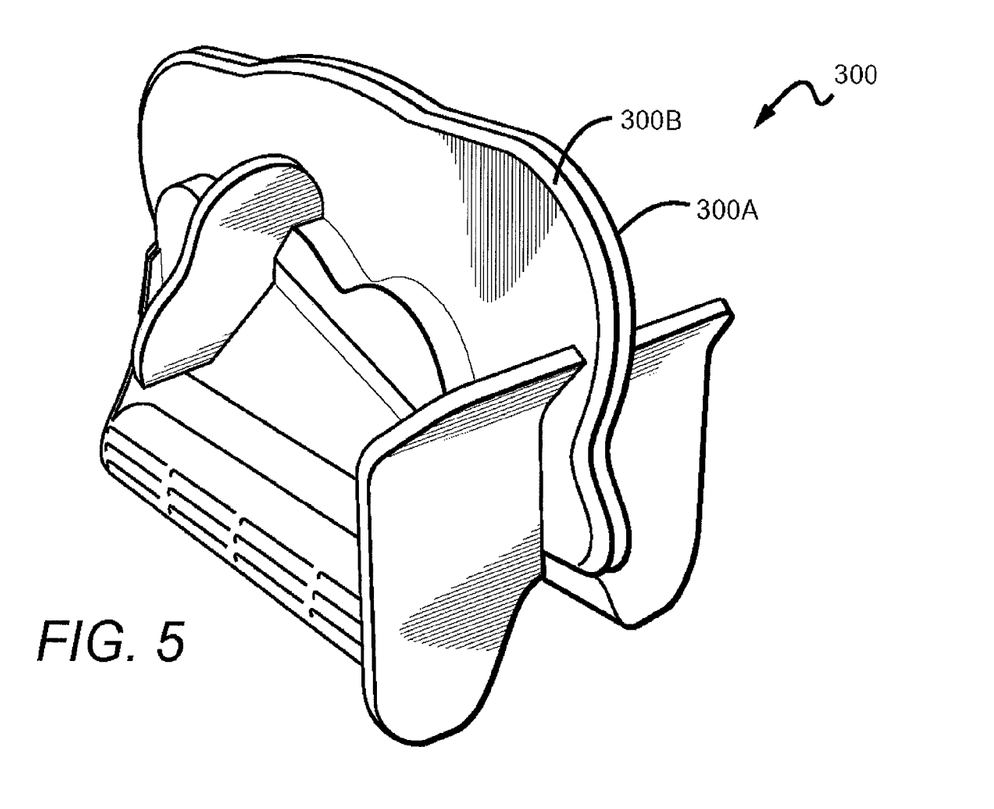
FIG. 5 is a perspective view of an alternative embodiment of a pair of right and left box lifting devices in a storage configuration.

FIGS. 3A and 3B generally depict the underside of the right half 100A and the left half 100B of the mating pair, respectively. The right and left halves 100A and 100B include the following, respectively: (1) handles 110A, 110B coupled to lifting bodies 120A, 120B; (2) lifting plates 170A, 170B coupled to the underside of lifting bodies 120A, 120B; (3) lifting members 172A, 172B extending outwardly from lifting plates 170A, 170B; and (4) openings 174A, 174B in lifting plates 170A, 170B, which receive lifting members 172B, 172A, respectively, such that the lifting members of one plate enter the openings in the other plate and vice versa during storage of the right and left halves in a mating configuration as shown in FIG. 5. Preferred openings are stamped into the lifting plate by a machine press, and can have any suitable cross sectional area and shape.

Figure 3C:
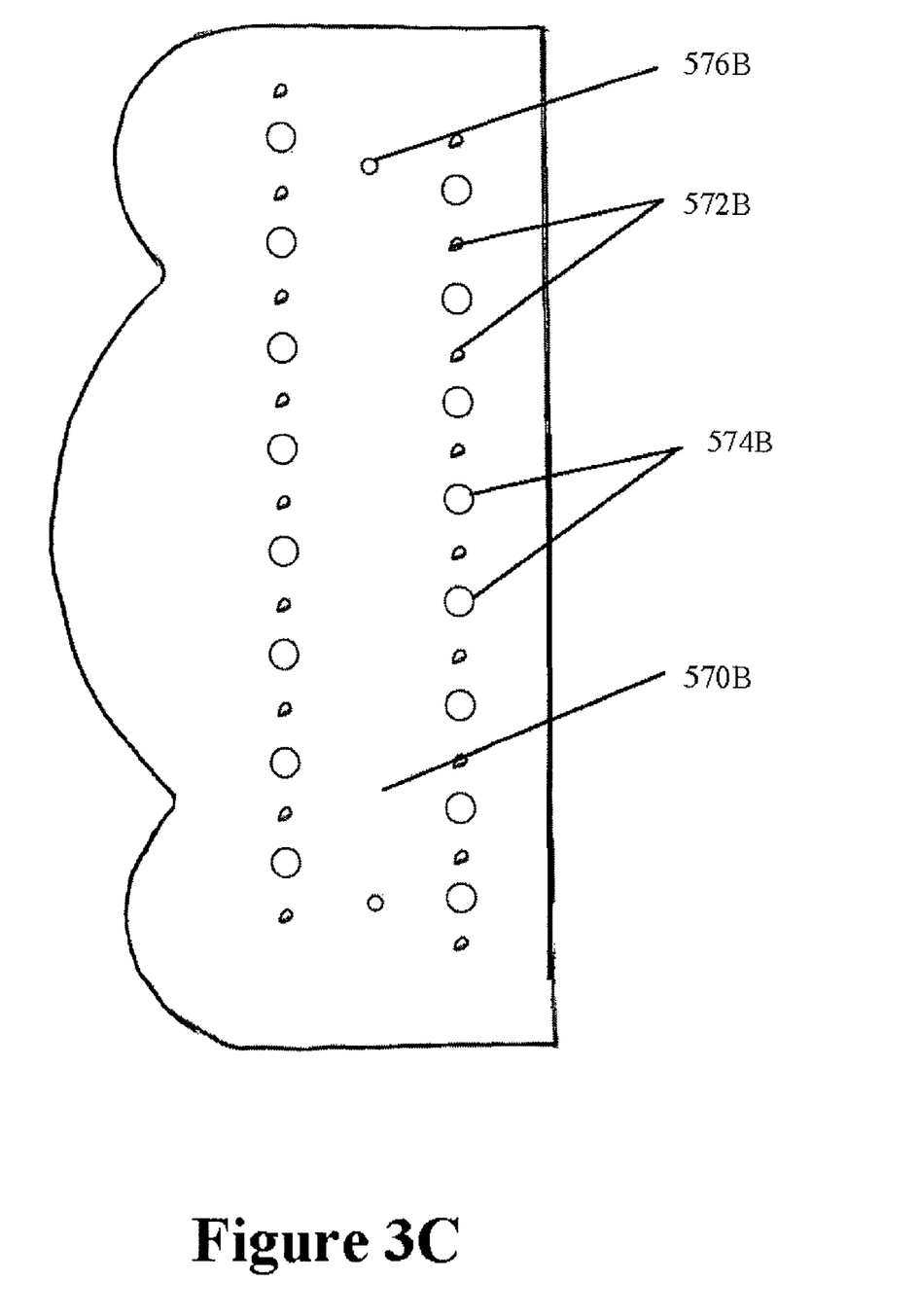
FIG. 3C is plan view of an alternative lifting plate having pins.

Lifting plates 170A, 170B can be fabricated out of aluminum, steel, or other suitable metallic materials, and can be stamped by a machine press to form punched out teeth (i.e. the plurality of lifting members 172A, 172B). Preferred lifting members 172A, 172B can be any suitable size, but preferably are sized to prevent damage to the box and its contents. Still further, lifting plates 170A, 170B are removably coupled to lifting bodies 120A, 120B, respectively, via apertures 176A, 176B for the insertion of removable fasteners (e.g., screws). The position of apertures 176A, 176B correspond to fastener inlets (not shown) integrated on the underside of lifting bodies 120A, 120B, respectively. FIG. 3 depicts an alternative lifting plate 570B in which the lifting members can be pins 572B extending outwardly therefrom. Pins 572A (not shown) extending from the right lifting plate (not shown) can be received by openings 574B in the left lifting plate 570B.

Lifting bodies 120A, 120B advantageously extend at least 0.5, 1.0, 1.5, 2.0, 2.5, 3.0, 3.5, and 4.0 cm beyond the edges of removable lifting plates 170A, 170B in first, second, and third directions, as shown by arrows 1, 2, 3, respectively, to increase the surface area between the box and the device, thus enhancing the stabilization of the box during lifting.

In preferred embodiments, tips 173A, 173B of lifting members 172A, 172B are angled other than 90° relative to a long axis of handles 110A, 110B. Most preferably, tips 173A, 173B are angled at a 45° angle relative to the long axis of handles 110A, 110B, but other suitable angles are contemplated, including for example 30°, 35°, 40°, 50°, 55°, and 60°. By angling tips 173A, 173B, as shown by angle X in FIGS. 3A and 3B, the user is encouraged to insert the lifting members 172A, 172B into a box with the tips 173A, 173B directed upward, such that the handles 110A, 110B are also angled, thus, allowing the user to easily lift a box above the user's head. Horizontal positioning of the handles in the prior art does not facilitate lifting boxes above a user's head due to the fact that the user's wrist must bend uncomfortably and the box tends to fall into the user.

Thus, angling tips 173A, 173B relative to the long axis of handles 110A, 110B causes the user's wrists to be maintained automatically in the proper position for lifting boxes above the user's head. Once the user has properly grasped a pair of the devices, one with each hand, the user inserts lifting members 172A, 172B into opposite sides of a corrugated box and applies upward pressure which secures the lifting members 172A, 172B within the inner fluted layer of the corrugated box such that the box can be lifted and transported conveniently using the pair of devices 100A, 100B.

The inventor has also found that a 30°-60° angle between lifting members 172A, 172B and lifting plates 170A, 170B (that is the angle the lifting members 172A, 172B extend away from lifting plates 170A, 170B) increases the contact surface area between lifting members 172A, 172B and the box. The increased contact surface area prevents lifting members 172A, 172B from ripping through the box during use, and is well-suited for gripping and supporting the box during lifting.

One or both lifting plates 170A, 170B can incorporate one or more magnets 178A. As shown in FIG. 3A, magnets 178A are operable to connect the mating pair 100A and 100B during non-use for storage. Openings 174B in the left lifting plate 170B correspond to the position of the lifting members 172A in the right lifting plate 170A. Thus, the left and right halves 100B, 100A can be coupled to one another by magnets 178A such that lifting members 172B in the left lifting plate 170B enter openings 174A in the right lifting plate 170A and vice versa forming a mating pair, which is small and convenient for storage. FIG. 5 generally depicts an alternative embodiment of a mating pair of devices 300 in a storage configuration; the pair of devices 300 having a left mating half 300B and a right mating half 300A.

Figure 4:
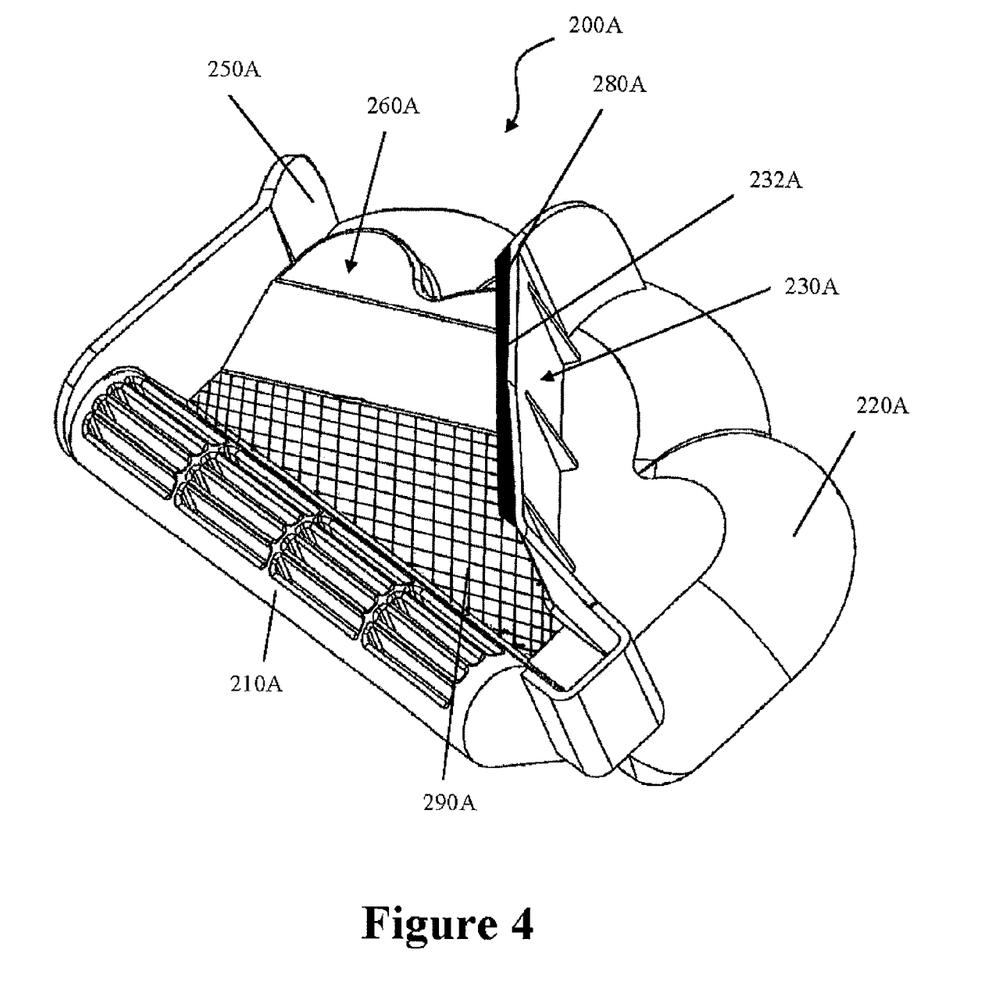
FIG. 4 is a perspective view of an alternative embodiment of a right handed box lifting device having a sweat texture portion and a cushion.

FIG. 4 generally depicts an alternative embodiment of the right mating half 200A of the mating pair (left mating half 200B, not shown), in which a sweat texture portion 290A is disposed in an area defined by the handle 210A, the weight transfer member 230A, and the medial forearm stop 250A. The sweat texture portion 290A provides the user with an improved grip during use. It is further contemplated that a user replaceable cushion 280A having a thickness of at least 0.5 cm can be coupled to contact surface 232A, thus providing a user with smaller hands, a customizable fit. It is further contemplated that the left mating half (not shown) also includes the sweat texture portion 290B (not shown) and the user replaceable cushion 280B (not shown).

FIG. 6 depicts a contemplated best mode of the device, such that the handle 410A, the lifting body 420A, the weight transfer member 430A, the medial forearm stop 450A, and the wrist riser 460A can be fabricated as continuous injection molded piece.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A pair of devices for assisting a user in lifting a box, each device comprising:
   a lifting body;
   a handle coupled to the lifting body; and
   a weight transfer member coupled to the lifting body in a manner that transfers weight from the box through a contact surface of the member, to a lateral surface of a forearm or hand of the user: and
   a lifting plate, wherein the lifting plate is part of the lifting body, and wherein the lifting plate of a first one of the pair includes openings for receipt of a plurality of lifting members disposed on the lifting plate of a second one of the pair.

2. The devices of claim 1, wherein the contact surface measures at least 25 cm$^2$.

3. The devices of claim 1, further comprising a cushion interposed between the contact surface and the lateral surface.

4. The devices of claim 3, wherein the cushion has a region having thickness of at least 0.5 cm.

5. The devices of claim 3, wherein the cushion is replaceable by the user.

6. The devices of claim 1, wherein the contact surface comprises a main portion, and further comprising a thumb guard that is angled relative to the main portion.

7. The devices of claim 1, wherein the contact surface comprises a main portion, and further comprising a lateral forearm stop that is angled relative to the main portion.

8. The devices of claim 7, wherein the lateral forearm stop is continuous with the main portion.

9. The devices of claim 1, wherein each device further comprises a medial forearm stop positioned to contact a medial surface of a forearm of the user.

10. The devices of claim 1, wherein each device further comprises a wrist riser positioned to contact an anterior surface of a forearm of the user.

11. The devices of claim 1, further comprising a lifting plate removably coupled to the body.

12. The devices of claim 11, wherein the lifting body extends at least 0.5 cm beyond edges of the removable lifting plate in first, second, and third directions.

13. The devices of claim 11, further comprising a plurality of lifting members extending from the lifting plate.

14. The devices of claim 13, wherein the plurality of lifting members are selected from the group consisting of punched out members and pins.

15. The devices of claim 1, further comprising a plurality of lifting members angled other than 90° relative to a long axis of the handle.

16. The devices of claim 1, further comprising one or more magnets operable to separably couple the devices.

17. The pair of device of claim 1, further comprising a sweat texture portion disposed in an area defined by the handle, the weight transfer member, and a medial forearm stop.

18. A pair of devices for assisting a user in lifting a box, each device comprising:
   a lifting body;
   a lifting, wherein the lifting plate is part of the lifting body, and wherein a plurality of lifting members extend from the lifting plate, wherein the lifting plate of a first one of the pair includes openings for receipt of a plurality of lifting members disposed on the plate of a second one of the pair;
   a handle coupled to the lifting body; and
   a first stop that restricts a bending movement of one of the user's wrists relative to the handle.

19. The devices of claim 18, further comprising a weight transfer member coupled to the lifting body in a manner that transfers weight from the box through a contact surface of the member, to a lateral surface of a forearm or hand of the user.

20. The devices of claim 19, wherein the first stop is angled relative to the weight transfer member.

21. The devices of claim 18, wherein the first stop is disposed to contact a lateral surface of a user's forearm.

22. The devices of claim 21, further comprising a second stop disposed to contact a medial surface of a user's forearm.

23. The devices of claim 18, wherein the plurality of lifting members are angled other than 90° relative to a long axis of the handle.

24. The devices of claim 1 or 18, wherein the lifting plate is removably attached to the lifting body.

* * * * *